United States Patent [19]  [11] Patent Number: 4,536,963
Yamamoto et al.  [45] Date of Patent: Aug. 27, 1985

[54] DIGITAL INDICATION TYPE MEASURING MACHINE

[75] Inventors: Takeshi Yamamoto; Hideo Sakata, both of Kawasaki, Japan

[73] Assignee: Mitutoyo Mfg. Co., Ltd., Tokyo, Japan

[21] Appl. No.: 643,225

[22] Filed: Aug. 21, 1984

[30] Foreign Application Priority Data

Aug. 29, 1983 [JP] Japan .................. 58-133266[U]
Aug. 29, 1983 [JP] Japan .................. 58-133267[U]

[51] Int. Cl.³ .................................. G01B 5/12
[52] U.S. Cl. ........................... 33/178 E; 33/143 L;
                                33/147 K; 33/147 N; 33/166
[58] Field of Search ........... 33/143 L, 147 N, 147 K,
                                33/166, 178 E, DIG. 1, DIG. 3

[56] References Cited

U.S. PATENT DOCUMENTS 2,642,671  6/1953  Graham et al. ............... 33/178 E
3,484,942 12/1969  Toubhaus ....................... 33/166
3,803,518  4/1974  Perthen ....................... 33/178 E X
4,136,456  1/1979  Yamauchi et al. ............. 33/178 R X
4,207,679  6/1980  Poage ............................. 33/166
4,218,823  8/1980  Matsumoto et al. ....... 33/DIG. 3 X

FOREIGN PATENT DOCUMENTS 0044823  1/1982  European Pat. Off. ............. 33/166
2813842 10/1978  Fed. Rep. of Germany .... 33/178 E
 472020  6/1969  Switzerland .................... 33/147 K
2028508  3/1980  United Kingdom ................ 33/166
2114748  8/1983  United Kingdom ............. 33/178 E Primary Examiner—Robert S. Ward
Attorney, Agent, or Firm—Flynn, Thiel, Boutell & Tanis

[57] ABSTRACT

A digital indication type measuring machine comprising: a main body having a spindle displaceable in the axial direction thereof and a digital indication portion; a plurality of measuring heads detachably mounted to the main body, being different in size from one another, and each incorporating therein cone, in each of which a displacement value of the spindle is converted into a radial projection value of each of measuring elements at conversion rates equal to one another; an encoder for sensing the displacement value of the spindle; and a circuit for processing an output from the encoder and digitally indicating the resultant value.

13 Claims, 5 Drawing Figures

DIGITAL INDICATION TYPE MEASURING MACHINE

BACKGROUND OF THE INVENTION

1. Filed of the Invention

This invention relates to a digital indication type measuring machine.

2. Description of the Prior Art

In general, a so-called digital indication type measuring machine, wherein a measuring machine such as a micrometer, slide calipers or the like attachingly provided with an encoder and a measured value is digitally indicated, has been widely utilized because of such advantages that the reading of a measured value is easily performed and the measuring accuracy is high. Out of such digital indication type measuring machines, as a measuring machine for measuring an inner diameter of a work, there has been known a so-called a hole tester (inner diameter measuring instrument), in which three measuring elements arranged at intervals of 120° for example, are simultaneously enlarged in diameter and an inner diameter is measured by projection values of the measuring elements.

In the hole tester of the type described, a spindle, a dial gauge and the like are generally provided in a direction perpendicular to the direction of enlarging the diameter of the measuring elements so that the hole tester can be applied to a deep hole and the like. In this case, as the means for converting a displacement of the spindle to displacements of the measuring elements, a tapered surface, a cam, a link mechanism and the like are used in many cases. However, in order to achieve high controllability and high precision measurement, it is necessary that the main body be rendered compact in size and have a small diameter. Hence, the range of measurement covered by one hole tester is very limited. In consequence, as far as the hole tester is concerned, a plurality of hole testers different in size for every ranges of measurement should be prepared, thus resulting in an increased economic burden.

In contrast thereto, there has been known such a hole tester, in which only the displacement converting mechanism and measuring elements are replaced with new ones with the main body remaining the same, so that the measuring range can be enlarged. However, the hole tester of this type requires the matching between the measuring diameter and the dial graduation or thimble graduation. Hence, the finishing accuracies of the main body and the members on the converting side and the method of fixation therebetween become strict, thus resulting in increased manufacturing costs and inconvenience in handling. Furthermore, the adjustment between the position of the spindle and the graduation for the absolute calibration is required for each replacement, thus resulting in decreased working efficiency.

Now, with the development in the electronic technology, the measuring machines of recent type has been provided with the functions such as zero point setting, change-over between inch and mm and the like, which have not been provided with the conventional measuring instruments. However, if the main body of the measuring machine would become large in size along with such a development as described above, the value of the development would be reduced to a considerable extent.

Here, from an antinomy between an increased function and a device compact in size leads to questions concerning the sizes and locations of control switches in particular. More specifically, since the control switches should be as small as possible and should be disposed at a specific surface of a measuring instrument, there is presented such a problem that an unaimed switches tend to be mistakenly operated.

This is particularly true with the aforesaid hole tester and the like, whereby a blind operation is required because the measurement should be completed in a hole and the reading should be performed outside the hole. Furthermore, in a measuring instrument with means of high-class functions, wherein a plurality of functions are provided in a single switch in order to reduce an absolute number of switches, to thereby achieve the program switching and the like, there is presented the disadvantage that a measurer cannot grasp the meaning of the contents of indication.

SUMMARY OF THE INVENTION

An object of the present invention is to provide a digital indication type measuring machine wherein the adjustment is not required for each replacement of a measuring head, the finishing accuracies required of the main body and the measuring head are comparatively moderate and the expansion of the measuring range can be achieved.

To this end, the present invention contemplates that a plurality of measuring heads each including direction changing mechanism, in each of which the rate between a displacement of the spindle and a radial projection value of each of the measuring elements is set at a predetermined value, are detachably provided on the main body, while, an indication circuit for digitally indicating a displacement value of the spindle in an indicator is provided with a zero clear function.

More specifically, such an arrangement is adopted that the measuring machine comprises: a main body having a spindle displaceable in the axial direction thereof; a plurality of measuring heads detachably mounted to this main body, being different in size from one another, and each incorporating therein direction changing mechanism, in which a displacement value of the spindle is converted into a radial projection value of measuring elements at conversion rates equal to one another; a displacement detector for detecting a displacement value of the spindle; and an indication circuit processing an output from the displacement detector, digitally indicating the resultant value in an indicator and having a zero clear function for forcedly clearing the indicated value to zero value irrespective of the position of the spindle.

DETAILED DESCRIPTION OF THE PREFERRED EMBODIMENT

Description will hereunder be given of one embodiment of the present invention with reference to the drawings.

Figure 1:
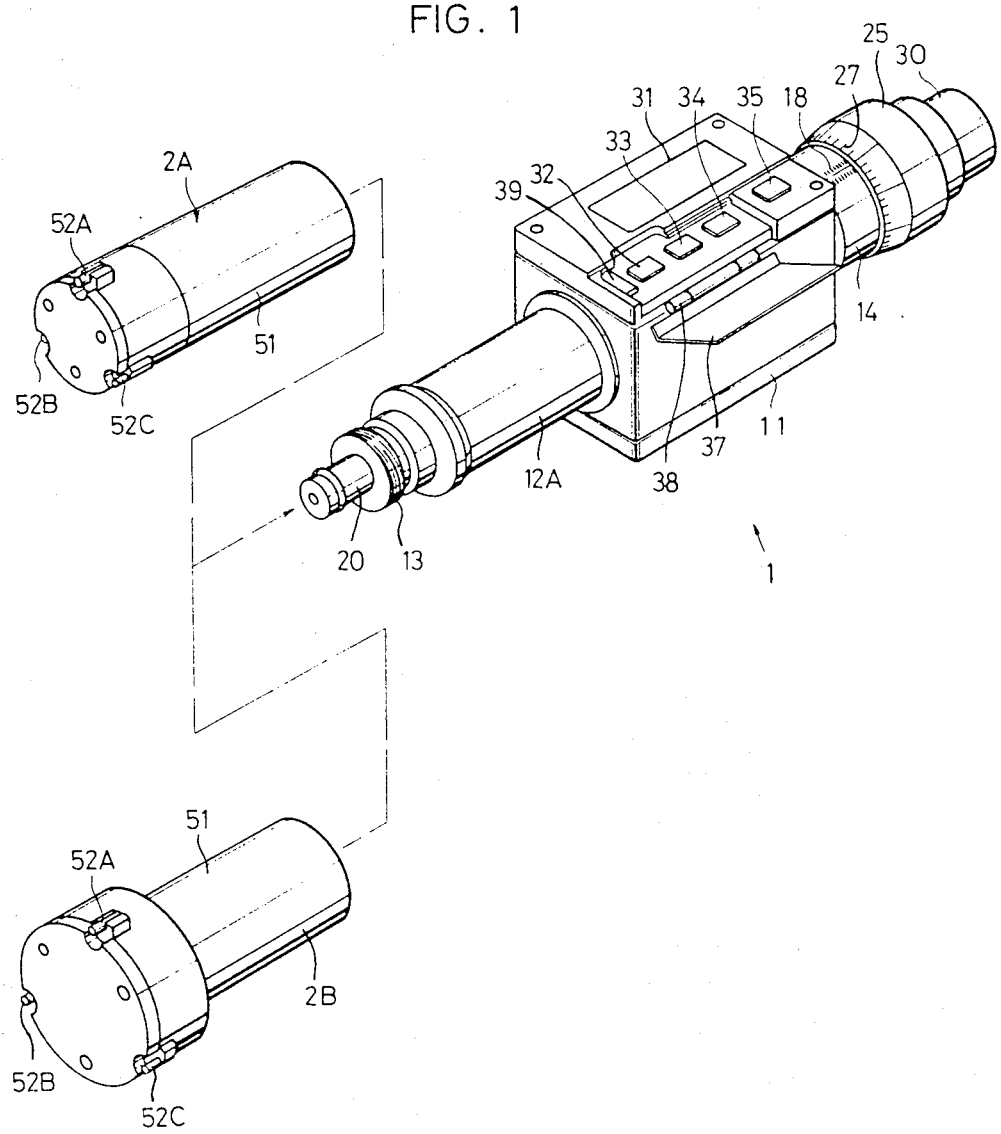
FIG. 1 is a disassembled perspective view showing one embodiment of the present invention.
Figure 2:
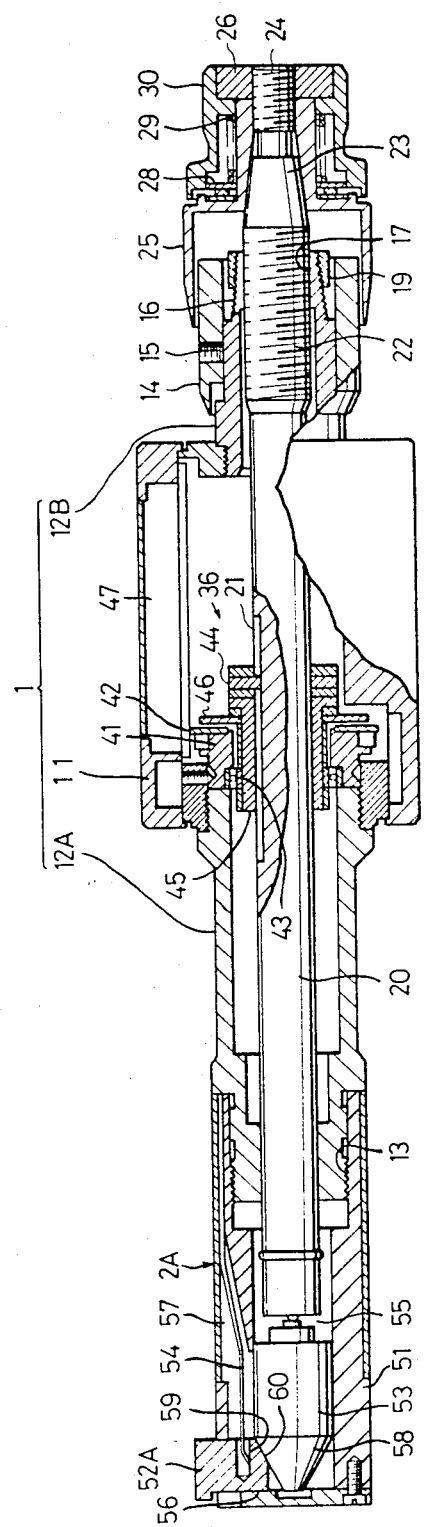
FIG. 2 is a sectional view showing the assembled-up state.

FIG. 1 is a disassembled perspective view showing the hole tester of this embodiment and FIG. 2 is a sectional view showing the assembled-up state, respectively. Referring to these drawings, the hole tester comprises a main body 1 and a plurality of measuring heads 2A and 2B, which are selectively, detachably mounted to the main body 1 and different in size from each other.

The main body 1 comprises a rectangular-shaped case 11 and cylindrical inner sleeves 12A and 12B secured to opposite end surfaces of the case 11 on one and the same axis. The inner sleeve 12A is formed on the outer peripheral surface of the outer end portion thereof with external threads 13, onto which the respective measuring heads 12A and 12B are selectively, threadably coupled. Furthermore, the inner sleeve 12B is coupled onto the outer peripheral surface thereof with an outer sleeve 14 in a manner to be rotatable and slidable in the axial direction thereof and fixable by a set-screw 15. The inner sleeve 12B is further formed on the outer peripheral surface of the outer end portion thereof with external threads 16 and on the inner peripheral surface of the outer end portion thereof with internal threads 17. A graduation 18 is formed on the outer surface of the outer sleeve 14 in the axial direction of the outer sleeve 14. Furthermore, a tapered nut 19 is threadably coupled onto the external threads 16. Further, the internal threads 17 is coupled thereinto with the proximal end portion of a spindle 20, the forward end of which is held by the inner peripheral surface of the outer end portion of the inner sleeve 12A in a manner to be rotatable and axially displaceable.

The spindle 20 is formed at the substantially central portion in the longitudinal direction thereof with a keyway 21 in the axial direction thereof, and further, formed on the side of the proximal end thereof with external threads 22 coupled into the internal threads 17 of the inner sleeve 12B, a tapered shaft portion 23 progressively reduced in its diameter toward the proximal end and external threads 24. A thimble 25 is coupled onto the tapered shaft portion 23 and fixed integrally therewith by a nut 26 threadably coupled onto the external threads 24 of the spindle 20. With the above-described arrangement, rotation of the thimble 25 causes the spindle 20 to be displaced in the axial direction thereof due to the threadable coupling with the internal threads 17 of the inner sleeve 12B. Formed on the outer peripheral surface of the thimble 25 in the circumferential direction thereof is a graduation 27 for indicating a displacement value of the spindle 20 from the relationship with the graduation 18 of the outer sleeve 14. Furthermore, a ratchet mechanism 28 is provided between the thimble 25 and the nut 26, and the ratchet mechanism 28 is rotatably provided thereon with a ratchet sleeve 30 in a manner to be biased in a direction of separating therefrom through a spring 29. With the above-described arrangement, rotation of the ratchet sleeve 30 rotates the thimble 25 through the engagement with the ratchet mechanism 28. When a load beyond a predetermined value is applied to the spindle 20, the engagement with the ratchet mechanism 28 is released, whereby the ratchet sleeve 30 effects idling with respect to the thimble 25.

Figure 3:
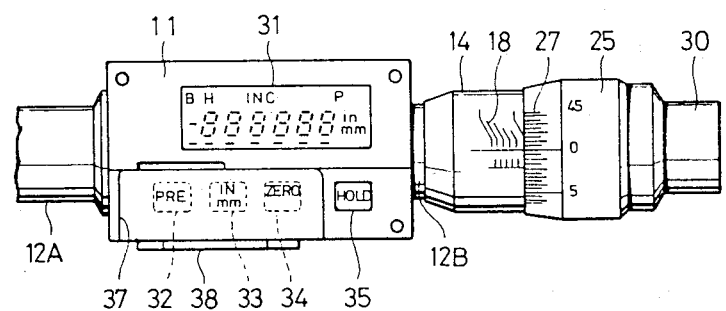
FIG. 3 is a plan view showing a portion of the above.

Furthermore, as shown in FIG. 3, the case 11 is provided on the planar surface thereof with a digital indicator 31 in the upper portion and a preset button 32, an inch/mm change-over button 33, a zero clear button 34 and a hold button 35 in the lower portion, respectively, and further provided therein with a rotary encoder 36 as being a detector for detecting a displacement of the spindle 20. A protective cover 37 is openably provided for the preset button 32, inch/mm change-over button 33 and zero clear button 34. The protective cover 37 is rotatably supported at the proximal end portion thereof by the case 11 through a hinge 38, and is adapted to be attracted and held by a magnet 39 provided on the case 11 at the time of closing when it covers the buttons. Normally, during repeated measuring operations, the preset button 32, inch/mm change-over button 33, zero clear button 34 and the like are operated only at the start of measurement. Hence, when the protective cover 37 is closed after the operation, the aforesaid buttons can be prevented from being mistakenly operated at the time of measuring an inner diameter of a hole in a work.

Figure 4:
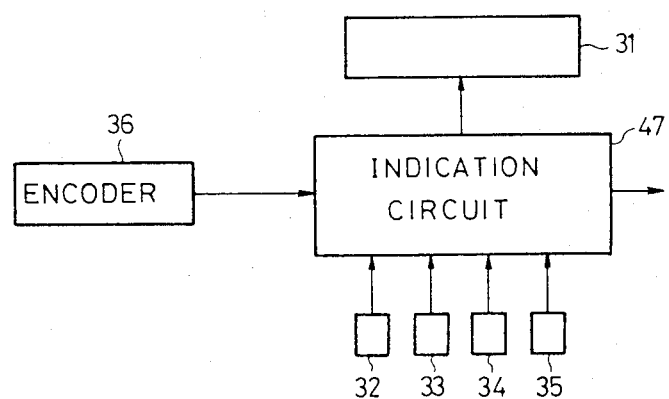
FIG. 4 is a circuit diagram thereof.

The rotary encoder 36 includes a disc-shaped stator 42 fixed to the case 11 through a stator holding member 41, a rotor holding ring 45 rotatably supported by the stator holding member 41 through a bearing 43 and having a key 44 slidably engaged with the keyway 21 of the spindle 20, and a rotor 46 secured to the rotor holding ring 45 in opposed relationship to the stator 42, and is adapted to detect a rotation number of the rotor 46 against the stator 42, i.e. to detect a displacement of the spindle as a pulse number. The pulse number detected here on the basis of the displacement value of the spindle 20 is delivered to an indication circuit 47. As shown in FIG. 4, the indication circuit 47 processes the pulses delivered from the rotary encoder 36 and digitally indicates the result in the digital indicator 31. On the other hand, the indication circuit 47 has a hold function of holding a value indicated in the digital indicator 31 when the hold button 35 is operated and a zero clear function of forcedly clearing the indicated value in the digital indicator 31 irrespective of the position of the spindle 20 when the zero clear button 34 is operated. Furthermore, the indication circuit 47 has a preset function of successively renewing the indicated value in the digital indicator 31 when the preset button 32 is operated, indicating a dispacement value of the spindle 20 as a value added to the indicated value at the time when the preset button 32 is operated for the second time when the preset button 32 is operated again, and thereafter, keeping the same operation. Further, the indication circuit 47 has a function of indicating a displacement of the spindle 20 in inches when inch/mm change-over button 33 is operated, and thereafter, keeping the same operation.

On the other hand, each of the measuring heads 2A and 2B comprises: a main body of head 51 threadably coupled to the outer end portion of an inner sleeve 12A of the main body 1; three measuring elements 52A, 52B and 52C arranged at intervals of 120° on the forward end portion of this main body of head 51 in a manner to be linearly movable in a direction perpendicular to the moving direction of the spindle 20, i.e. in the radial direction of the spindle 20; a cone 53 movable in the same direction as the moving direction of the spindle 20 in the main body of head 51, as being a direction changing mechanism for converting a displacement value of the spindle 20 into radial projection values of the measuring elements 52A, 52B and 52C at a predetermined conversion rate; and leaf springs 54 for biasing the measuring elements 52A, 52B and 52C toward the cone 53. In the main body of head 51, there are provided a cone receiving hole 55 for receiving the cone 53 movable in the direction of the center axis thereof, measuring element guide grooves 56 for receiving the measuring elements 52A, 52B and 52C linearly movable in the radial direction and arranged at the intervals of 120° on the forward end portion of the main body of head 51 and leaf spring receiving recesses 57 for receiving the leaf springs 54. Furthermore, the cone 53 is in contact at the proximal end thereof with the forward end of the spindle 20 and has the forward end formed into a conical shape 58. Here, the cones 53 incorporated in the respective measuring heads 2A and 2B are formed into the conical shapes 58 which are identical in inclination with each other. In other words, a displacement of the spindle 20 is converted into the projection values of the measuring elements 52A, 52B and 52C at the conversion rates equal to one another. Further, the measuring elements 52A, 52B and 52C is each provided at the substantially central portion thereof with a leaf spring engaging portion 59, with which the forward end of the leaf spring 54 is engageable, and formed at the inner end thereof with an inclined surface 60 fitting in with the inclination of the conical shape 58 of the cone 53.

Description will now be given of action of this embodiment. In measuring the diameter of a hole, the measuring heads 2A and 2B having dimensions suitable for the diameter of the hole to be measured are selected, and, any one of the measuring heads 2A and 2B, which are selected, is coupled to the external threads 13 of the main body 1.

Here, when the measuring head 2A or 2B is inserted into a ring gauge as being the reference for the diameter of the hole and the thimble 25 is rotated, the spindle 20 together with the thimble 25 are displaced in the axial direction thereof because the spindle 20 is threadably coupled to the internal threads 17. When the spindle 20 is displaced, the measuring elements 52A, 52B and 52C are projected in the radial direction of the spindle 20 through the cone 53 being in contact with the forward end of the spindle 20. Then, rotation of the thimble 25 causes the spindle 20 to be displaced, the displacement value is converted into the projection values of the measuring elements 52A, 52B and 52C through the cone 53, the protective cover 37 is opened in the state where the measuring elements 52A, 52B and 52C are brought into contact with the inner peripheral surface of the ring gauge, the zero clear button 34 is pressed to clear the indicated value of the digital indicator to zero, and thereafter, the protective cover is closed, thereby performing the measurement. When the protective cover 37 is closed as described above, the buttons other than the hold button 35, i.e. the preset button 32, inch/mm change-over button 33 and zero clear button 34 can avoid being mistakenly operated during measuring operation.

To perform the measurement, the measuring head 2A or 2B is inserted into a hole of a work, rotation of the thimble 25 similarly to the above causes the measuring elements 52A, 52B and 52C to project in the radial directions through the spindle 20 and the cone 53, and the measuring elements 52A, 52B and 52C are brought into contact with the inner peripheral surface of the hole, respectively. In this case, the projection values of the measuring elements 52A, 52B and 52C, i.e. the displacement value of the spindle 20 is detected as a pulse number by the rotary encoder 36, and thereafter, the pulse number is digitally indicated in the digital indicator 31 through the indication circuit 47. In consequence, when a value digitally indicated in this digital indicator 31 is read, a value of error of the diameter of the hole in the work with respect to the reference dimension of the ring gauge can be read.

During the zero clear operation as described above, if the outer sleeve 14 is rotated and caused to slide in the axial direction thereof, whereby the zero position of the graduation 18 is coincided with the zero position of the graduation 27 of the thimble 25, then a value of error of the diameter of the hole in the work can be read from the read values of the graduation 18 of the outer sleeve 14 and the graduation 27 of the thimble 25 in the same manner as in the prior art. Furthermore, in the state where the measuring elements 52A, 52B and 52C are brought into contact with the inner peripheral surface of the ring gauge, the preset button 32 is pressed instead of the zero clear button 34, and, when the indicated value of the digital indicator 31 reaches the value of the reference dimension of the ring gauge, the preset button 32 is pressed again, so that the diameter of the hole in the work can be indicated as an absolute dimension.

Here, if the hole, the diameter of which is to be measured, is a deep one and the digital indicator 31 is inserted into this deep hole, then the hold button 35 is pressed, the value indicated in the digital indicator 31 is held, and thereafter, the main body 1 is drawn out of the hole, so that the diameter of the hole, the diameter of which is to be measured, can be readily read.

Furthermore, when it is desirable to measure holes different in diameter from each other, if the measuring heads 2A and 2B are removed from the main body 1 and other measuring head 2A or 2B is threadably coupled thereto, then the holes different in diameter can be measured in the same manner as described above. In this case, even if the measuring head 2A or 2B removed to be replaced in the main body 1, there is no need to effect adjustment each time the measuring head 2A or 2B is replaced because the conversion rate, at which the displacement of the spindle 20 is converted to the projection values of the measuring elements 52A, 52B and 52C is predetermined.

In consequence, according to this embodiment, a plurality of measuring heads 2A and 2B different in size from each other are detachably provided on the main body 1 having the spindle 20, the cone 53 capable of converting the displacement value of the spindle 20 into the projection values of the measuring elements 52A, 52B and 52C at a predetermined conversion rate is provided in each of the measuring heads 2A and 2B, so that only the replacement of the measuring head 2A or 2B in the main body 1 makes it possible to measure the holes different in diameter from each other. This makes it possible to commonly use the main body 1, so that the common use of the comparatively expensive rotary encoder 36 and digital indicator 31 renders the measuring machine inexpensive in construction.

Moreover, the conversion rate (the rate of the protrusion values of the measuring elements 52A, 52B and 52C to the displacement value of the spindle 20) of the cone 53 incorporated in each of the measuring heads 2A and 2B is predetermined and the indicated value can be cleared to zero irrespective of the position of the spindle 20, so that, even if the measuring heads 2A and 2B are replaced, there is no need to make correcting operation after the replacement only if the indicated value is cleared to zero after the replacement. This leads to such an advantage that there is no need to finish with high accuracy the coupling portions between the measuring heads 2A, 2B and the main body 1.

Furhtermore, since the indication circuit 47 is provided with the hold function, the measuring heads 2A and 2B are inserted into a hole, the diameter of which is to be measured, in the work, the diameter of the hole is measured, thereafter, the hold button 35 is operated to hold an indicated value, the main body 1 is drawn out of the hole, and thereafter, the indicated value can be read, so that there is no need to read the indicated value in an instable state where the main body 1 is inserted in the hole. This leads to such an advantage that the measurement can be performed even when the digital indicator 31 is inserted into a deep hole or the like. Further, since the indication circuit 47 is provided with the preset function, the diameter of the hole in the work can be indicated as an absolute dimension.

In the repeated measurements, the preset button 32, inch/mm change-over button 33 and zero clear button 34 are operated only at the start of the measurement. If these buttons would be operated during measuring operation, mistaken measured data might be obtained. In this embodiment, the protective cover 37 is openably provided for the preset button 32, inch/mm change-over button 33 and zero clear button 34, so that such a possibility can be eliminated that the above-described buttons are mistakenly operated during measuring operation. Moreover, the protective cover 37 is rotatably mounted to the main body 1 through a hinge 38 and attracted by the magnet 39 when closed, so that the opening or closing operation is easily effected and no disturbance is given to the measuring operation. In other words, a reliable measurement can be expected therefrom.

In addition, in working, as the means for detachably connecting the measuring heads 2A or 2B to the main body 1, e.g. chuck type means may be adopted in place of the screw type means.

Furthermore, as the means for detecting a displacement value of the spindle 20 movably provided on the main body 1, the rotary encoder 36 need not necessarily be used, in short, any means, which can detect the displacement of the spindle 20 with high accuracy, may be used.

As the direction changing mechanism provided in each of the measuring heads 2A and 2B, e.g. a cam, a link mechanism or the like may be adopted in place of the cone 53.

Figure 5:
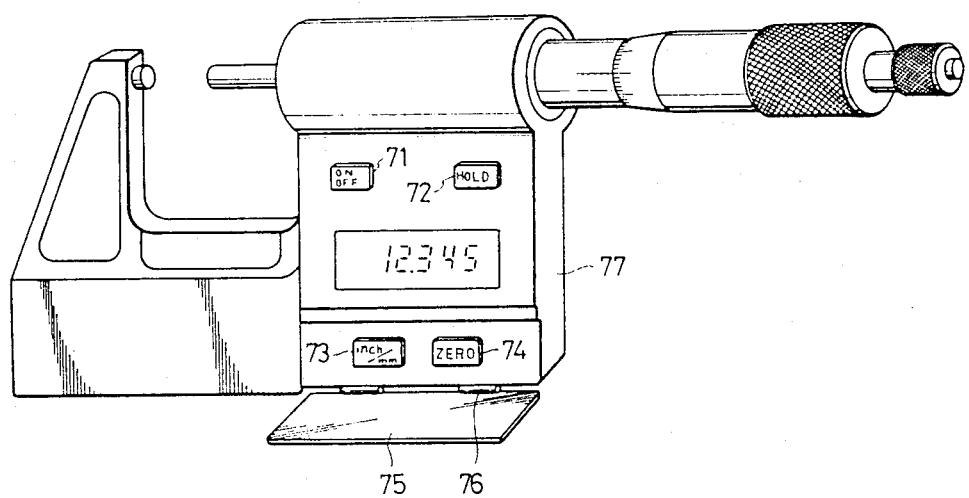
FIG. 5 is a perspective view showing a micrometer to which a protective cover used in the above embodiment is provided.

In the above embodiment, description has been given of an example in which the protective cover 37 is provided on the hole tester, however, the protective cover 37 is applicable to a micrometer, slide calipers and the like for example. FIG. 5 shows an example in which the protective cover is applied to a micrometer. In this example, out of the various buttons provided on the micrometer, including an on-off button 71, hold button 72, inch/mm change-over button 73 and zero clear button 74, for the inch/mm change-over button 73 and zero clear button 74, a protective cover 75 is openably provided on a main body 77 of the micrometer through a hinge 76. With this arrangement, these buttons unnecessary during measuring operation can avoid being mistakenly operated, because the manual operation is adopted in the micrometer in particular. The protective cover may be formed of a transparent material and may be of slide type for example in place of openable type. Further, the control buttons made unoperable by the protective cover may be determined in accordance with the types of the measuring instruments and the like, and, in general, the buttons not requiring the frequent operation may be selected.

As has been described hereinabove, the present invention can provide a digital indication type measuring machine wherein the adjustment is not required for each replacement of a measuring head, the finishing accuracies of the main body and the measuring unit are comparatively moderate and the expansion of the measuring range can be achieved.

What is claimed is:

1. A digital indication type measuring machine comprising:
   a main body having a spindle displaceable in the axial direction thereof;
   a plurality of measuring heads detachably mounted to said main body, being different in size from one another, and each incorporating therein direction changing mechanism, in each of which a displacement value of said spindle is converted into a radial projection value of each of plural measuring elements at conversion rates equal to one another;
   a displacement detector for detecting a displacement value of said spindle; and
   an indication circuit processing an output signal from said displacement detector to obtain a measured length signal, digitally indicating a measured length value obtained from said measured length signal in an indicator and having a zero clear mechanism for forcedly clearing the indicated value in the indicator to zero value irrespective of the position of said spindle.

2. A digital indication type measuring machine as set forth in claim 1, wherein said direction changing mechanism is movable in the same direction as the moving direction of said spindle, has the forward end portion formed into a conical shape, and the inner side portions of said measuring elements are brought into contact with said forward end portion.

3. A digital indication type measuring machine as set forth in claim 1, wherein said measuring elements are arranged at three positions at intervals of 120° on the outer peripheral surface of said measuring head.

4. A digital indication type measuring machine as set forth in claim 1, wherein said measuring elements are resiliently biased in the retracting direction of said direction changing mechanism.

5. A digital indication type measuring machine as set forth in claim 2, wherein the inner side portion of each of said measuring elements is formed into an inclined surface fitting in with the shape of the forward end portion of said direction changing mechanism.

6. A digital indication type measuring machine as set forth in claim 1, wherein said displacement detector comprises a rotary encoder incorporated in the main body.

7. A digital indication type measuring machine as set forth in claim 1, wherein a thimble is affixed to one end of said spindle and said thimble is provided with a ratchet mechanism for making the measuring pressure constant.

8. A digital indication type measuring machine comprising:
   a main body having a spindle displaceable in the axial direction thereof;

at least two measuring heads detachably mounted to said main body, being different in size from one another, and each incorporating therein direction changing mechanism, in which a displacement value of said spindle is converted into a radial projection value of each of plural measuring elements at conversion rates equal to one another;

an indication circuit processing an output signal from a rotary encoder for detecting a displacement of said spindle to obtain a measured length signal, digitally indicating a measured length value obtained from said measured length signal in an indicator and having a zero clear mechanism for forcedly clearing the indicated value in the indicator to zero value irrespective of the position of said spindle;

control buttons provided on said main body portion and giving predetermined indication commands to said indication circuit; and a protective cover for making said control buttons unoperable.

9. A digital indication type measuring machine as set forth in claim 8, wherein said protective cover is openably provided on said main body.

10. A digital indication type measuring machine as set forth in claim 8, wherein said protective cover is held by a magnetic force of a magnet provided on said main body when closed.

11. A digital indication type measuring machine as set forth in claim 8, wherein said control buttons include a hold button for holding an indicated value in the digital indicator, said hold button is not protected by said protective cover.

12. A digital indication type measuring machine as set forth in claim 8, wherein said direction changing mechanism comprises a cone movable in the same direction as the moving direction of the spindle.

13. A digital indication type measuring machine as set forth in claim 8, wherein said measuring elements are arranged at three positions at intervals of 120° on the outer periphery of the measuring head.

* * * * *